(No Model.)

J. B. McLANE.
AXLE CUTTER.

No. 245,304.  Patented Aug. 9, 1881.

Witnesses.
H. E. Lodge
F. S. Simpson

Inventor.
Jared B. McLane

UNITED STATES PATENT OFFICE.

JARED B. McLANE, OF NORTH READING, MASSACHUSETTS.

AXLE-CUTTER.

SPECIFICATION forming part of Letters Patent No. 245,304, dated August 9, 1881.

Application filed May 13, 1881. (No model.)

*To all whom it may concern:*

Be it known that I, JARED B. McLANE, a subject of Great Britain, residing at North Reading, in the county of Middlesex and State of Massachusetts, have invented certain new and useful Improvements in Axle-Cutters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The elementary features of this implement consist of a socketed stock terminating at one end in an open rectangular head which contains a pivoted bearing-plate to inclose the screw-threaded shank of the axle-journal, and at its other end is provided with a suitable handle for rotating the bearing-plate and cutter about such shank, the socket of the stock containing a proper tool longitudinally adjustable therein, while the head has a throat for the escape of chips between it and the nut of the axle, all as hereinafter explained.

Figure 1:
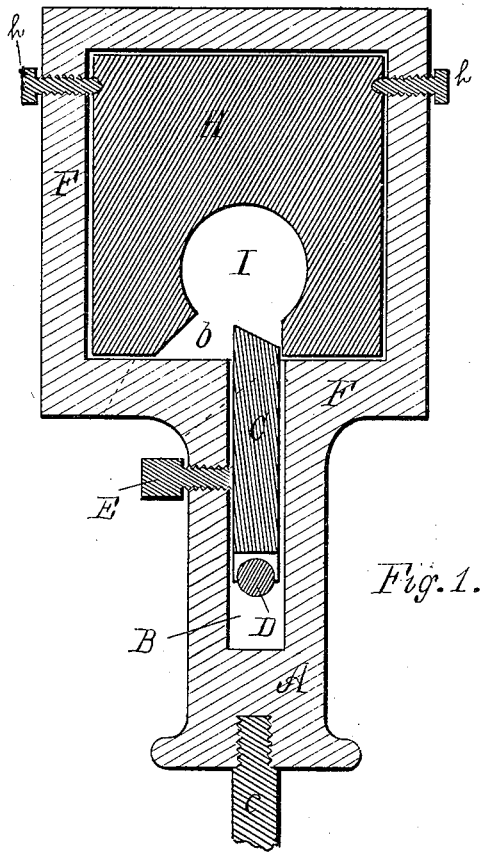
Figure 2:
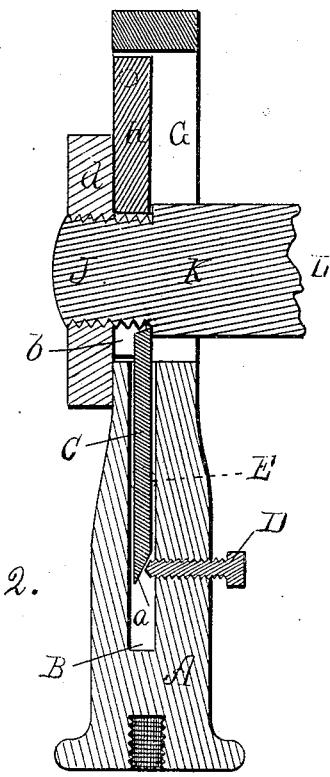
Figure 3:
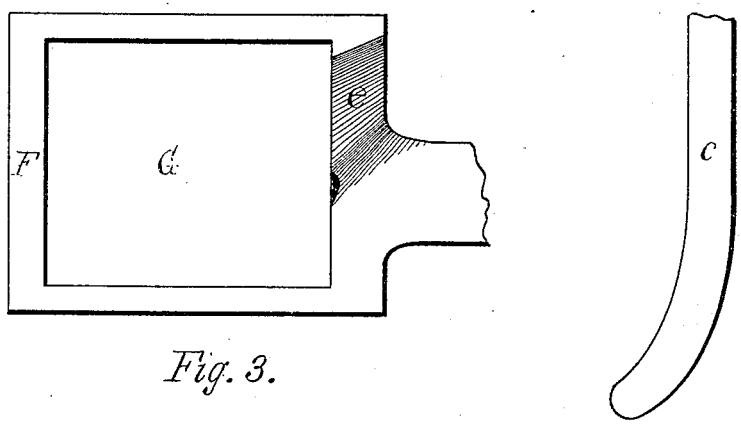

The drawings accompanying this specification represent, in Figure 1, a plan, and in Fig. 2 a section, of an implement containing my invention, the latter figure showing it as applied to a carriage-axle. Fig. 3 represents a detail view of the head of the stock.

In these drawings, A represents a straight metallic stock having an axial socket, B, to loosely receive the cutting-tool, which is shown at C, and is in form similar to the turning-tool of a machinist's lathe, the outer end or point of this tool being adapted to turn off or reduce the journal of a carriage-axle contiguous to its screw-thread.

The requisite adjustment or "feed" of the tool C is effected by a conical-pointed screw, D, which screws laterally through one side of the stock A and impinges against the inner end of the tool, which is beveled upon the side next the screw, as shown at a, by which the meeting faces of the tool and screw are parallel, or practically so; and the latter constitutes a wedge to push the tool outward, as occasion requires, to regulate the depth of its cut. A set-screw, E, is also screwed through one side of the stock A, so as to intercept the tool C and provide a means of confining the latter within the socket B to prevent misplacement or loss.

The tool C may be advanced by other means than the conical-pointed screw D, but the latter is a simple agent for the purpose.

The stock A terminates in an open rectangular head, F, the inclosure G of which contains a flat plate, H, having a circular opening, I, adapted to embrace the screw-threaded shank J of the journal K of a carriage-axle, L, and at its inner end a passage, b, to permit access of the tool C to the said journal K. The opposite end of the stock A has a handle, c, to obtain a powerful leverage to rotate the implement about the axle-journal, so that the tool may reduce the same.

When the implement is applied to an axle, in readiness to begin its work, the nut d of the shank J is screwed up against the bearing-plate, as shown in Fig. 2 of the drawings, and as the implement is rotated about the axle-journal the tool takes a chip from the latter, the nut is turned up and serves to feed the tool as the latter performs its work.

The office of bearing-plate H is to hold the journal against the tool C while the latter is operating on said journal. It is desirable, however, that this plate should not be rigid, because in that case the work of the cutting would not be satisfactorily performed, the resistance of the axle giving a sidelong strain to the blade, and the effort to overcome this resistance naturally causing a slightly deeper cut than is desired. To obviate this I pivot plate H in head F by means of pivot screws or pins h h, which allow a slight yielding of said plate and of the axle held thereby. This small amount of play suffices to prevent undue strain and overdeep or irregular cutting.

To permit the escape of chips behind the nut d as the axle-journal is being turned down by the rotation of the tool C about it, I form in the outer face of the head F, at its inner end, a depression, e, which, when the nut d is screwed up against the plate H, constitutes a throat or passage by which the said chips leave the implement.

To adapt the implement to carriage-axles of various styles or sizes, I provide a number of bearing-plates, the openings I of which vary in size.

In the use of my implement, to reduce the length of a worn axle-journal a bearing-plate with an opening of a size corresponding to the diameter of the screw-threaded shank of the axle is selected and secured within the head F. The bearing-plate is now passed about the screw-threaded shank, the tool C advanced to the proper point by means of the screw D, and the nut screwed upon such shank until the tool C is crowded up to the shoulder between the said shank and the axle-journal. By means of the handle $c$ the entire implement is now rotated about the shank J, and the nut $d$ turned up gradually as the tool reduces the axle-journal, the effect being the same as turning in an ordinary lathe, with the difference that the cutting-tool revolves about the work, while the latter is stationary.

By employing the screw-threaded shank of the axle-journal as a basis of support and rotation of my implement I gain an important advantage, for the reason that as this shank does not become worn out of round form, but always retains its original cylindrical shape, the portion of the journal reduced by the tool C must necessarily be cylindrical, as the shank constitutes a pattern for the tool.

If the bearing-plate of my implement, when in use, encircled the axle-journal as a turning-point, the portion of the journal reduced by the tool would in many cases be "out of true," for the reason that the under side of the said journal through wear becomes flat, and the bearing-plate, following this mutilated periphery of the journal, would cause the portion cut by the tool to be of like shape; hence the screw-thread subsequently cut upon the portion reduced by the tool would be imperfect.

My implement is strong, simple, and effective in operation, and can be produced at comparatively low cost.

It is not absolutely essential that the bearing-plate should be pivoted to or removable from the open head F, as the implement would do effective work if the plate were rigid with the head; but I decidedly prefer to pivot the plate within the head, for the purposes stated.

Under some circumstances it may be desirable to allow the bearing-plate to inclose and travel about the journal of the axle in lieu of its screw-threaded shank, as stated. In this event the bearing-plate is to be increased in thickness upon its inner side, to project beyond the cut made by the tool.

I do not confine myself to the bearing-plate as pivoted to or removable from the head F, nor as adapted to inclose only the screw-threaded shank of the axle-journal.

Having thus described the nature, purposes, and advantages of my invention, I claim, and desire to secure by Letters Patent of the United States, as follows:

1. The bearing-plate in combination with the annular head and the tool-bearing stock, said plate being pivoted within such head, substantially as herein set forth.

2. The channel or depression in the stock, constituting, in conjunction with the nut of the axle, a throat or passage for chips cut by the turning-tool, substantially as herein set forth.

In testimony whereof I affix my signature in presence of two witnesses.

JARED B. McLANE.

Witnesses:
 H. E. LODGE,
 F. G. SIMPSON.